United States Patent
Quioc et al.

(10) Patent No.: US 8,936,272 B1
(45) Date of Patent: Jan. 20, 2015

(54) GAS GENERATING SYSTEM

(71) Applicant: TK Holdings Inc., Armada, MI (US)

(72) Inventors: Eduardo L. Quioc, Westland, MI (US);
Richard W. Morgan, Washington, MI (US); Bryan T. Cole, Shelby Township, MI (US)

(73) Assignee: TK Holdings Inc., Armada, MI (US)

( * ) Notice: Subject to any disclaimer, the term of this patent is extended or adjusted under 35 U.S.C. 154(b) by 0 days.

(21) Appl. No.: 13/859,701

(22) Filed: Apr. 9, 2013

Related U.S. Application Data (60) Provisional application No. 61/621,985, filed on Apr. 9, 2012, provisional application No. 61/666,854, filed on Jun. 30, 2012, provisional application No. 61/672,804, filed on Jul. 18, 2012.

(51) Int. Cl.
*B60R 21/26* (2011.01)
*C06D 5/00* (2006.01)

(52) U.S. Cl.
CPC .......... *C06D 5/00* (2013.01); *B60R 2021/26029* (2013.01); *B60R 2021/26076* (2013.01)
USPC .......................................... 280/741; 102/530

(58) Field of Classification Search
USPC .......................................... 280/741; 102/530
See application file for complete search history.

(56) References Cited

U.S. PATENT DOCUMENTS

| | | | | |
|---|---|---|---|---|
| 5,779,268 | A | * | 7/1998 | Smith et al. .................... 280/741 |
| 6,044,557 | A | * | 4/2000 | Smith et al. .................... 29/897.2 |
| 6,056,314 | A | * | 5/2000 | Shirk et al. .................. 280/728.2 |
| 7,077,428 | B2 | * | 7/2006 | Barker et al. .................. 280/736 |
| 7,401,810 | B2 | * | 7/2008 | Brisighella et al. ........... 280/741 |
| 8,375,862 | B2 | * | 2/2013 | Morgan et al. ................. 102/530 |
| 8,393,641 | B1 | | 3/2013 | Quioc ............................ 280/741 |
| 2005/0121894 | A1 | * | 6/2005 | Brisighella et al. ........... 280/741 |
| 2011/0088583 | A1 | * | 4/2011 | Morgan et al. ................. 102/530 |
| 2013/0276660 | A1 | * | 10/2013 | Ukita et al. ................... 102/530 |

OTHER PUBLICATIONS

U.S. Appl. No. 12/454,699, filed May 21, 2009.

\* cited by examiner

*Primary Examiner* — Karen Beck
(74) *Attorney, Agent, or Firm* — L.C. Begin & Associates, PLLC.

(57) ABSTRACT

A base assembly is provided for a gas generating system. The assembly includes a base having at least one opening formed therein, and an initiator assembly attached to the base so as to form a gas-tight seal surrounding the at least one opening. A retainer is attached to the base and includes an opening into which a portion of the initiator assembly extends. The retainer is attached to the initiator assembly along the retainer opening.

15 Claims, 11 Drawing Sheets

GAS GENERATING SYSTEM

CROSS-REFERENCE TO RELATED APPLICATIONS

This application claims the benefit of U.S. Provisional Application Ser. Nos. 61/621,985, filed on Apr. 9, 2012; 61/666,854, filed on Jun. 30, 2012; and 61/672,804, filed on Jul. 18, 2012, the disclosures of which are incorporated herein by reference in their entireties.

BACKGROUND OF THE INVENTION

The present invention relates generally to gas generating systems utilizing a pyrotechnic initiator for initiating operation of a gas generating system. In some gas generating system designs, the elevated pressure produced during combustion of gas generant materials may tend to produce a bowing or distension of portions of the system housing. This expansion of the housing may stress the gas-tight seals which seal possible undesirable leakage paths out of the housing. The stressing or failure of these seals may result in leakage of generated gases and reduced pressure during filling of an associated airbag, for example. Thus, a need exists for improved structures and methods for helping to ensure housing integrity during operation of the gas generating system.

SUMMARY OF THE INVENTION

In one aspect of the embodiments of the present invention, a base assembly for a gas generating system is provided. The assembly includes a base having at least one opening formed therein, and an initiator assembly attached to the base so as to form a gas-tight seal surrounding the at least one opening. A retainer is attached to the base and includes an opening into which a portion of the initiator assembly extends. The retainer is attached to the initiator assembly along the retainer opening.

In another aspect of the embodiments of the present invention, a base assembly for a gas generating system is provided. The assembly includes a base, an initiator assembly welded to the base so as to form a gas-tight seal between the initiator assembly and the base, and a retainer welded to the base and to the initiator assembly.

BRIEF DESCRIPTION OF THE DRAWINGS

FIG. 3A is a schematic view of a base and an initiator assembly in accordance with an embodiment of the present invention positioned in a welding fixture prior to welding of the initiator assembly collar 100a to the base first portion 11a.

FIG. 3B is a schematic view of a base and an initiator assembly in accordance with an embodiment of the present invention positioned in a welding fixture after the initiator assembly collar 100a has been welded to the base first portion 11a.

FIG. 4 is a partial cross-section view of a portion of the view shown in FIG. 3B showing a weld attaching the initiator assembly collar 100a to the base first portion 11a.

DETAILED DESCRIPTION

Like reference numerals refer to like parts throughout the description of several views of the drawings.

Figure 1A:
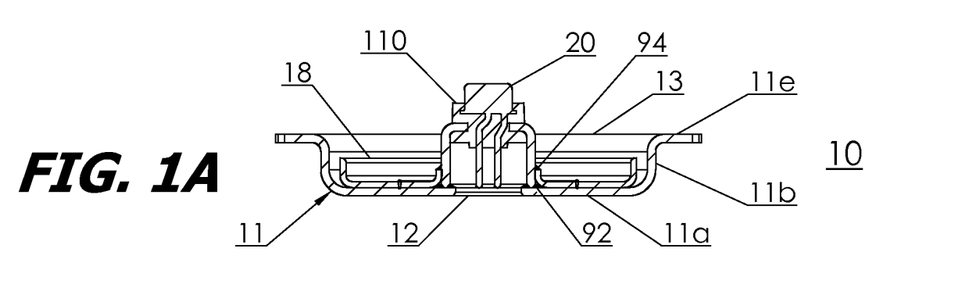
FIG. 1A is a cross-sectional side view of a base assembly for a gas generating system housing in accordance with a first embodiment of the present invention.
Figure 1B:
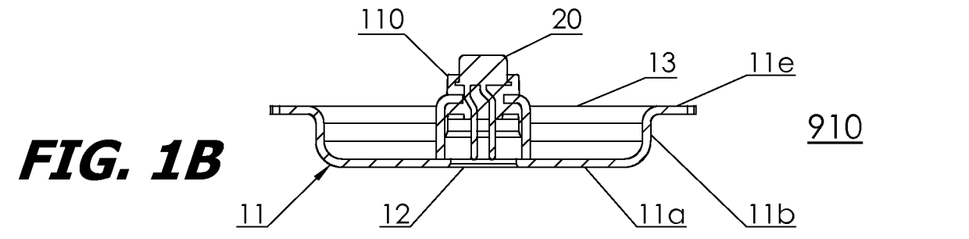
FIG. 1B is a cross-sectional side view of a base assembly for a gas generating system housing in accordance with a second embodiment of the present invention.
Figures 1C, 15:
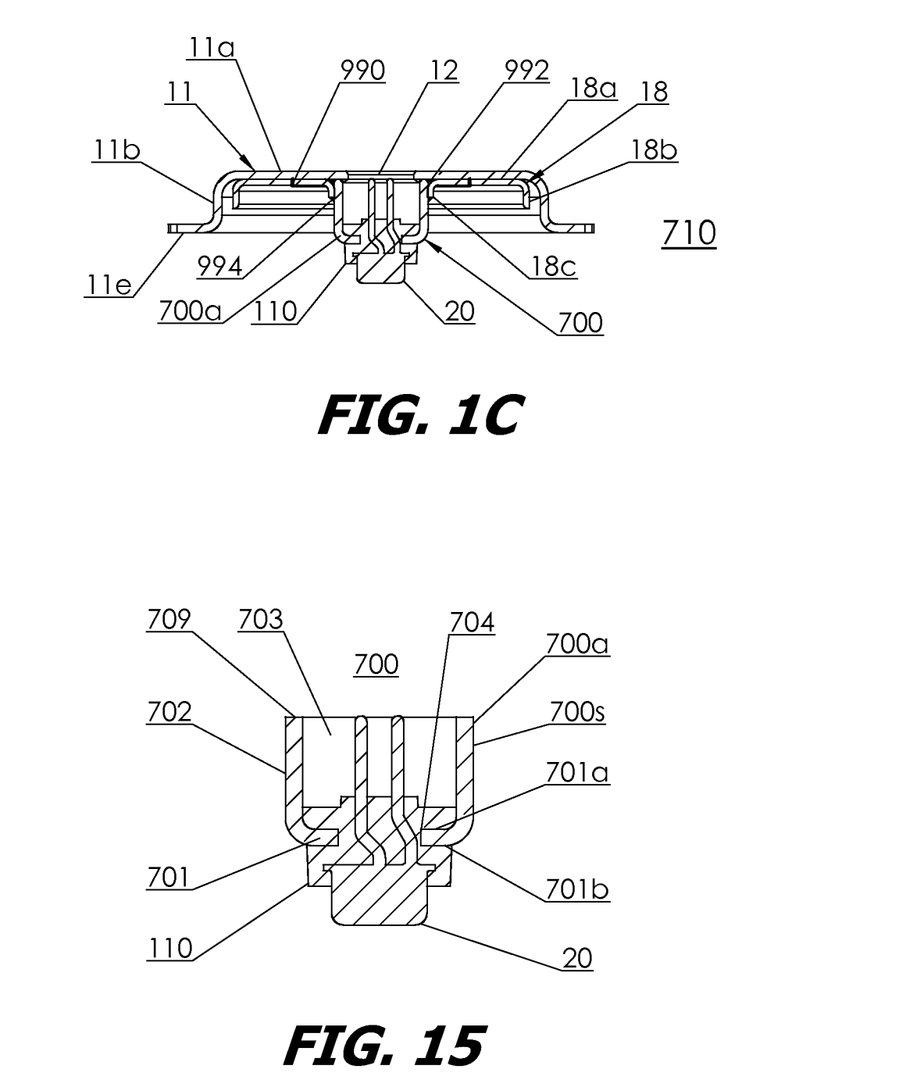
FIG. 1C is a cross-sectional side view of a base assembly for a gas generating system housing in accordance with another embodiment of the present invention, incorporating the initiator assembly shown in FIG. 15.
FIG. 15 is a cross-sectional side view of a molded initiator assembly similar to that shown in FIGS. 8A and 8B, in accordance with another embodiment of the present invention.

FIG. 1A shows a cross-sectional side view of one embodiment of a base assembly 10 forming part of a housing 34 gas generating system 200 (see FIG. 5) in accordance with one embodiment of the present invention. FIG. 1B shows a cross-sectional side view of one embodiment of a base assembly 910 forming part of a housing 134 gas generating system 290 in accordance with an alternative embodiment of the present invention. FIG. 1C shows a cross-sectional side view of an embodiment of a base assembly 710 forming part of a housing 734 gas generating system 400 in accordance with another embodiment of the present invention similar to the embodiment 200 shown in FIG. 5.

Figure 5:
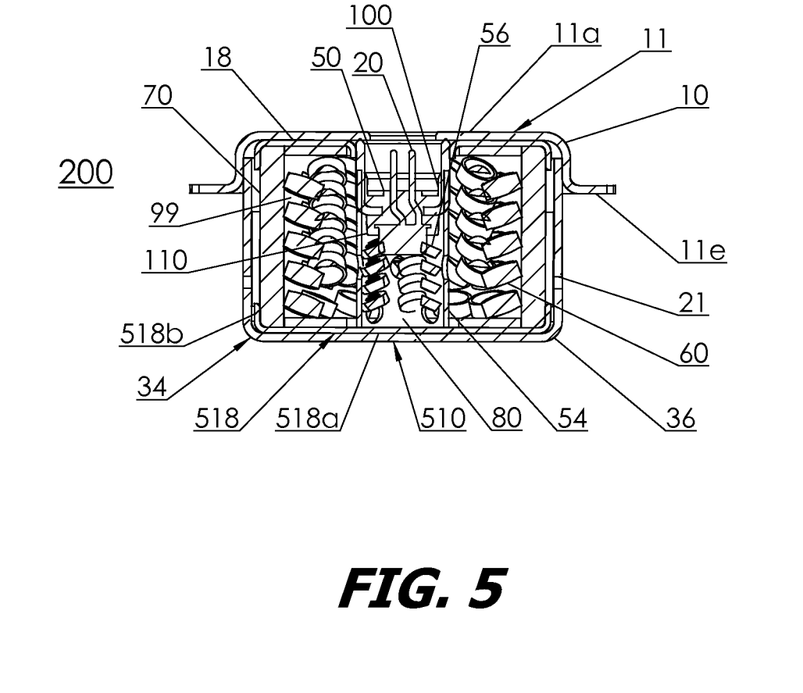
FIG. 5 is cross-sectional side view of a gas generating system incorporating a base assembly in accordance with an embodiment of the present invention.

In the embodiment shown in FIG. 1A, the base assembly 10 includes a base 11 forming part of a gas generating system housing 34 (see FIG. 5) which provides an enclosure containing known gas generating system components, such as an initiator 20, a booster cup 54 containing a booster material 56, a gas generant material 60, a filter 70, an auto-ignition material (not shown), and other components as shown in FIG. 5.

Figure 2:
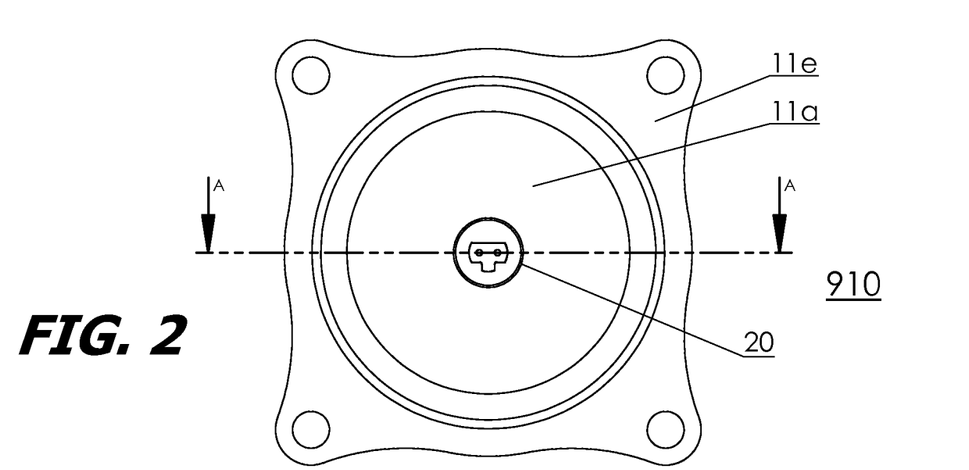
FIG. 2 is a plan view of the base assembly shown in FIG. 1B.
Figures 3A, 3B:
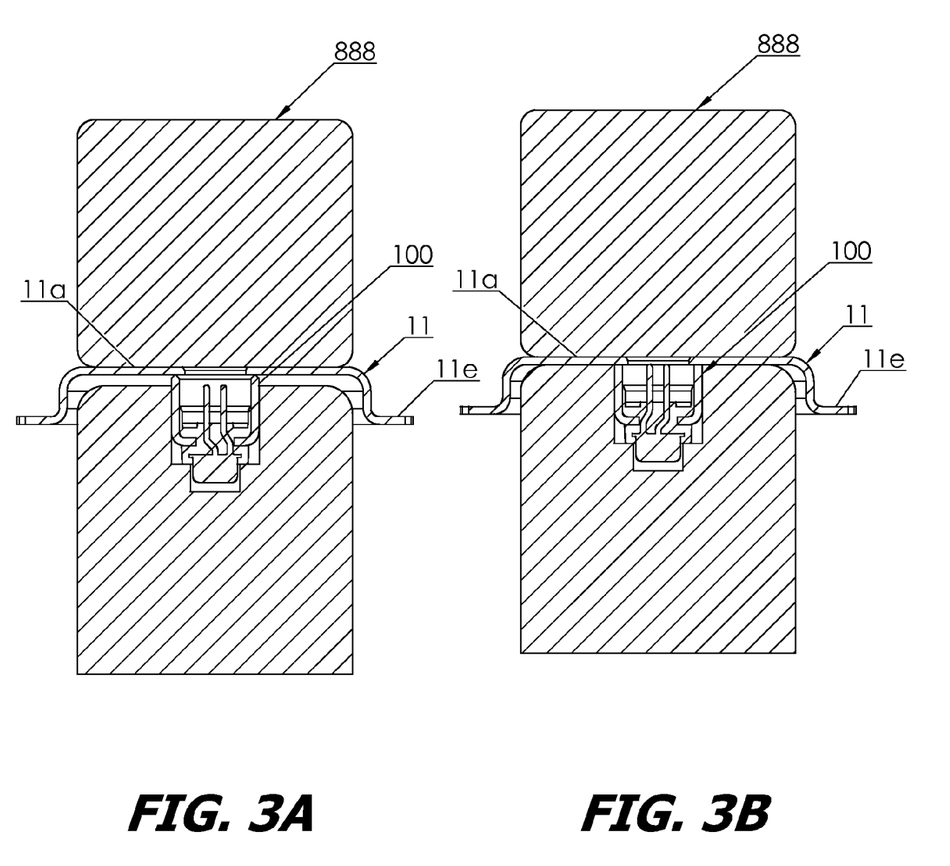
Figure 4:
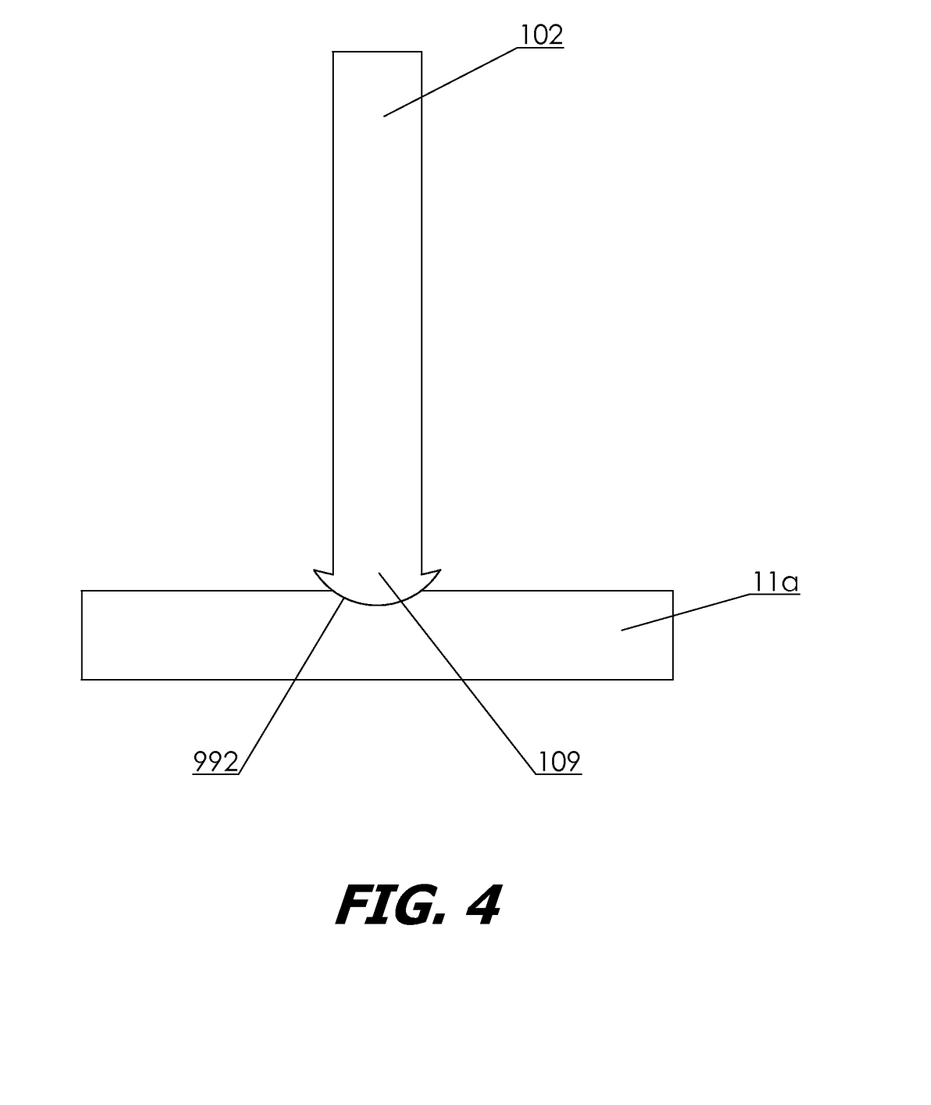

In the embodiments shown in FIGS. 1A, 1B, and 2, base 11 includes a first portion 11a having an orifice or through hole 12 formed for enabling access to a known pyrotechnic initiator 20 coupled to the base. A wall 11b extends from and along a periphery of first portion 11a. Wall 11b and first portion 11a combine to form an annular cavity 13 for receiving a portion of an optional retainer 18 therein. In the embodiments shown in FIGS. 1A, 1B, and 2, wall 11b is annular in configuration, although alternative wall configurations are possible depending on the requirements of a particular application. A peripheral flange 11e extends from outer wall 11b to facilitate mounting of the gas generating system to a vehicle or other device.

Figure 11:
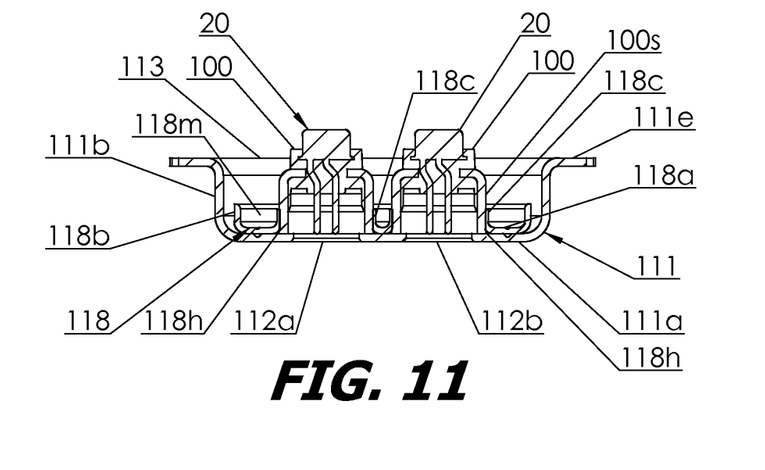
FIG. 11 is a cross-sectional side view of a base assembly for a gas generating system housing incorporating a pair of initiator assemblies, in accordance with another embodiment of the present invention.
Figure 13:
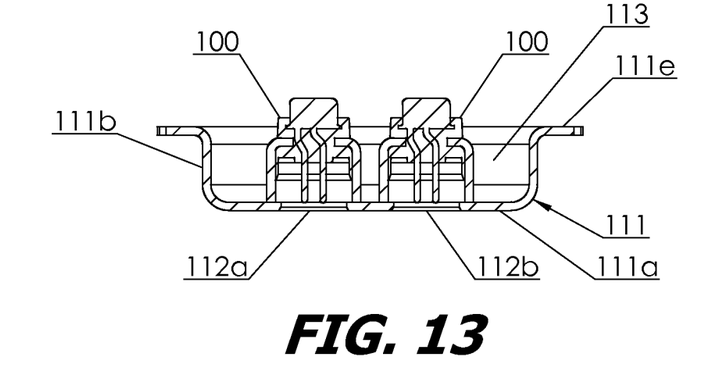
FIG. 13 is a cross-sectional side view of a base assembly for a gas generating system housing incorporating a pair of initiator assemblies and without a filter retainer, in accordance with another embodiment of the present invention.
Figure 14:
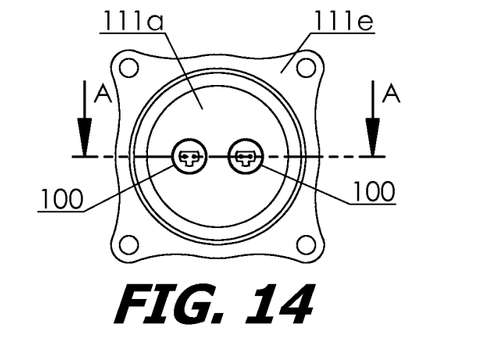
FIG. 14 is a plan view of the base assembly shown in FIG. 13.

FIGS. 11, 13 and 14 show an embodiment 111 of the base similar to embodiment 11 shown in FIGS. 1A, 1B and 2, but having two orifices 112a and 112b structured for enabling access to two pyrotechnic initiators 20 coupled to the base. A wall 111b extends from and along a periphery of first portion 111a. Wall 111b and first portion 111a combine to form a cavity 113 for receiving a portion of an associated, optional retainer 118 therein, if desired. In the embodiment shown in FIGS. 11, 13 and 14, wall 111b is annular in configuration, although alternative wall configurations are possible depending on the requirements of a particular application. A peripheral flange 111e extends from outer wall 111b to facilitate mounting of the gas generating system to a vehicle or other device. Base embodiments 11, 111 may be stamped or otherwise formed from a metal, metal alloy, or other suitable material.

Figure 7:
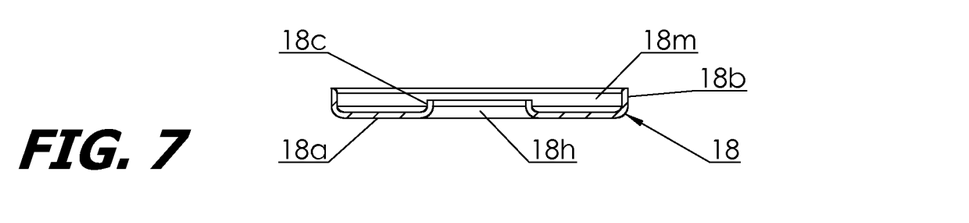
FIG. 7 is a cross-sectional side view of a filter retainer in accordance with an embodiment of the present invention.

In the embodiment shown in FIG. 1A, base assembly 10 also includes a retainer 18 for positioning and retaining therein a first end of a gas generating system filter 70 and a portion of a quantity of gas generant material 60 (described below) positioned within the filter. In the embodiment shown in FIGS. 1A and 7, retainer 18 has an annular base portion 18a, an annular outer wall 18b extending from an outer edge of the base portion, and an annular inner wall 18c extending from an inner edge of the base portion to define an opening 18h extending through a center of the retainer. Inner wall 18c, base portion 18a, and outer wall 18b combine to define a cavity 18m for receiving gas generant material 60 and an end portion of filter 70 therein, as seen in FIG. 5. In one embodiment, the wall 18c has a minimum height of 2.8 millimeters above an interior surface of the retainer from which the wall extends. It is believed that, as the length of the wall 18c increases (and, therefore, as the length of the wall in contact with the collar of the associated initiator assembly increases) the structural strength and/or stiffness of the base assembly proximate the initiator assembly correspondingly increases. Factors affecting the length of the wall 18c include the desired stiffness of the base assembly proximate the initiator assembly, restrictions on wall length due to physical interference with other elements of the gas generating system, the force required to insert the initiator assembly collar into the opening defined by the wall to achieve the desired interference fit, and other pertinent factors.

The inner diameter of the inner wall 18c is dimensioned to contact an exterior surface 100s of a collar 100a of an initiator assembly 100 (described below; see FIGS. 8A and 8B) in an interference fit when retainer opening 18h is positioned over an initiator assembly 100 attached to base 11 and the retainer 18 is brought into contact with the base 11 such that the initiator assembly 100 extends through opening 18h.

Referring to FIG. 1A, to attach the retainer 18 to base 11, initiator assembly 100 is passed through opening 18h, and base first portion 11a and retainer base portion 18a are brought into contact or close proximity with each other. The base and retainer are then welded together along the base first portion 11a and the retainer base portion 18a. Wall 18c is attached using a weld 94 to an adjacent outer surface 100s of wall 102 of initiator assembly 100. In one embodiment, weld 94 is a continuous laser weld which acts to form a gas-tight seal between the initiator assembly collar and the retainer. In a particular embodiment, the weld is formed along an end of wall 18c. However, the housing base, filter retainer, and initiator assembly may welded or otherwise connected together using any types of welds or other attachments suitable for the purposes described herein. Also, other methods of affixing the retainer to the base are also contemplated. Retainer 18 may be stamped, drawn, or otherwise formed from a metal, metal alloy, or other suitable material.

FIG. 1B shows a cross-sectional side view of another embodiment 910 of a base assembly. This embodiment uses the same base 11 as the base assembly shown in FIG. 1A. However, in this embodiment, there is no retainer 18 attached to the base 11.

Figure 12:
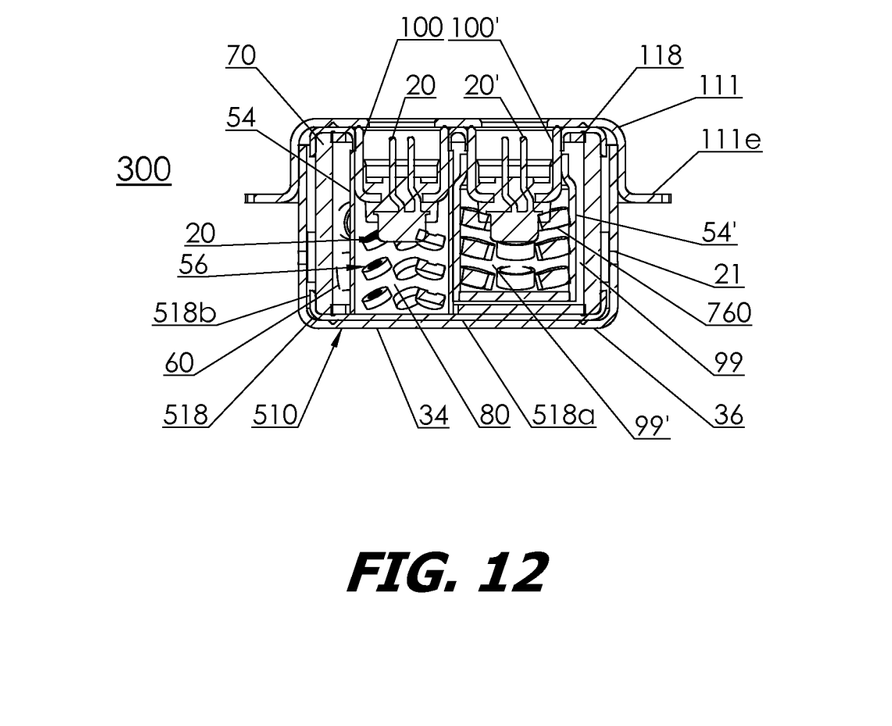
FIG. 12 is cross-sectional side view of a gas generating system incorporating the base assembly of FIG. 11.

Referring to FIGS. 11 and 12, in another embodiment of the base assembly, a retainer 118 similar to retainer 18 previously described is provided for positioning and retaining therein a first end of a gas generating system filter 70 and a portion of a quantity of gas generant material 60 (described below) positioned within the filter, as previously described. In the embodiment shown in FIGS. 11 and 12, retainer 118 has an annular base or first portion 118a, an annular outer wall 118b extending from an outer edge of the base portion, and a pair of spaced apart annular inner walls 118c extending from first portion 118a to define openings 118h extending through the retainer, similar to opening 18h formed in retainer 18 as previously described. Inner walls 118c, base portion 118a, and outer wall 118b combine to define a cavity 118m for receiving gas generant material 60 and an end portion of filter 70 therein. The inner diameter of the inner walls 118c are dimensioned to contact an exterior surface 100s of collar 100a (FIG. 8A) as previously described in a snug or sliding fit when retainer opening 118h is positioned over an initiator assembly 100 attached to base 111 and the retainer 118 is brought into contact with the base 111 such that the initiator assembly 100 extends through opening 118h. Retainer 118 may be attached to base 111 as previously described with respect to retainer 18 and base 11.

Referring to FIGS. 5 and 12, a cap assembly 510 is formed by securing another retainer 518 to a cap 36. Retainer 518 is structured for positioning and retaining therein a second end of gas generating system filter 70 and a portion of a quantity of gas generant material 60 (described below) positioned within the filter. In the embodiment shown in FIGS. 5 and 12, retainer 518 has an annular base portion 518a and an annular outer wall 518b extending from an outer edge of the base. Base portion 518a and outer wall 518b combine to define a cavity 518m for receiving therein gas generant material 60 and an associated end portion of filter 70 therein.

Referring again to FIGS. 1A and 5, gas generating system 200 also includes an initiator or igniter 20 positioned so as to enable fluid communication between the initiator and a booster composition or other ignitable material upon activation of the gas generating system, for initiating combustion of gas generant composition 60 in a manner known in the art. In the embodiment shown in FIG. 5, an end of initiator 20 extends from solidified mold material 110 into a booster chamber formed by a booster cup 54 incorporated into the gas generating system. In embodiments of the gas generating system described herein, the initiator 20 is incorporated into an initiator assembly 100 (FIGS. 8A and 8B) which is, in turn, incorporated into the base assembly 10. One example of an initiator suitable for use in the gas generating system of the present invention is described in U.S. Pat. No. 6,009,809, incorporated herein by reference.

Figure 8A:
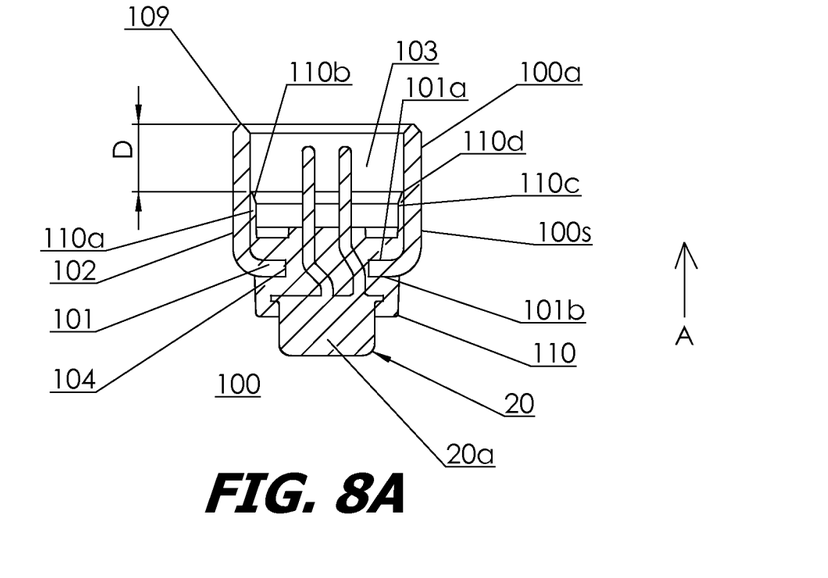
FIG. 8A is a cross-sectional side view of an embodiment of a molded initiator assembly incorporated into the base assembly embodiment shown in FIG. 1A.

Referring to FIG. 8A, initiator assembly 100 includes a collar 100a and initiator 20 molded to the collar using a flowable molding material 110 as described below. Collar 100a includes a base portion 101 and an annular wall 102 extending from and along a periphery of the base portion to define a cavity 103 therebetween. An opening 104 is formed in collar base portion 101 and is structured for receiving a portion of initiator 20 therethrough prior to execution of the molding operation. The very end surface or edge 109 of collar wall 102 may include features (such as projections or raised surfaces) formed therealong to facilitate welding of the end of the collar wall to gas generating system base 11/111, in a manner described below. Any embodiment of a collar described herein may be formed from a metal or any other suitable material.

In the embodiment shown in FIG. 8A, the molding material 110 forms a single, continuous mass extending along a first side 101a of the collar base portion, through opening 104, and along a second side 101b of the collar base portion. As this mass contacts both sides of the collar base portion and also contacts the walls of the base portion along opening 104, the molding material 110 forms a plug which is firmly fixed in position with respect to collar 100a. The solidified molding material also acts to form a gas-tight seal between the collar and the initiator.

Figure 9:
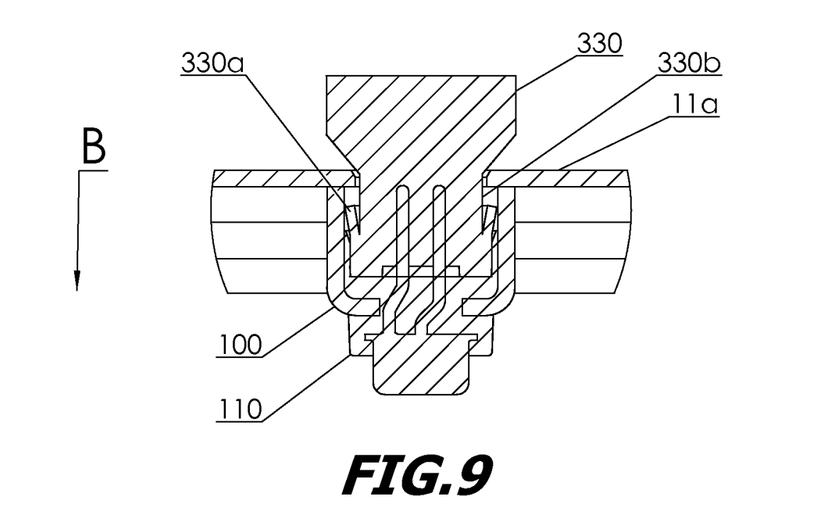
FIG. 9 is a partial cross-sectional side view of a connector element inserted into a cavity formed in an initiator assembly in accordance with the embodiment shown in FIG. 8A.
Figure 10:
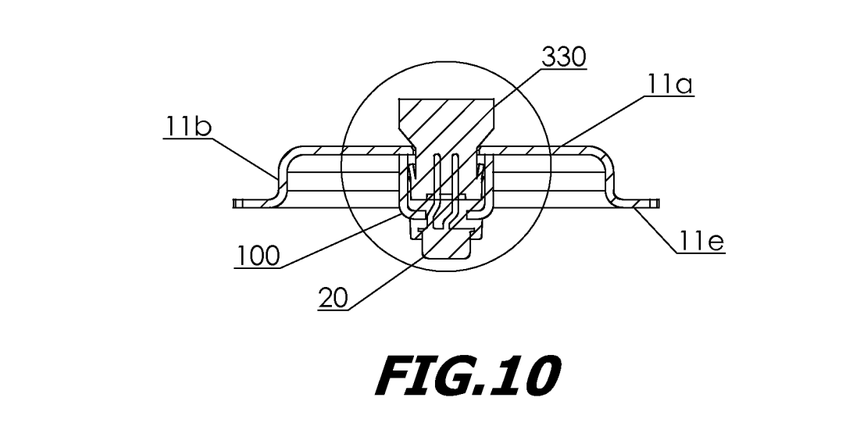
FIG. 10 is a cross-sectional side view of the connector element and initiator assembly of FIG. 9 incorporated into a base assembly in accordance with an embodiment of the present invention.

Also, as seen in FIG. 8A, a portion of the molding material 110 extends along a portion of collar wall 102 to form an annular wall 110a. An end portion 110b of wall 110a tapers in a direction toward collar wall 102 from a relatively thicker portion 110c to a relatively thinner portion 110d at the very end of the wall. In a particular embodiment, wall end portion 110b tapers to a sharp edge at the very end of the wall. In addition, as seen in FIG. 8A, the end 110d of the tapered molding material wall end portion 110b is spaced apart a predetermined distance D from the very end 109 of collar wall 102. In a particular embodiment, wall 110a has a total length of 4.8 millimeters from a level of the molding material 110 from which the initiator contacts project, to the end of the wall. It is also seen from FIGS. 8A, 9, and 10 that the distance D by which end 110d of tapered portion 110b is spaced apart from the collar end 109, and also the general dimensions and configuration of the tapered portion, are specified so as to provide a clearance for a portion 330a of connector element 330 structured to be inserted into collar cavity 103 after molding of the initiator to the collar. Connector element 330 has a body portion 330b and at least a pair of resiliently deflectable tabs 330a extending outwardly from the body portion 330b. After the initiator assembly 100 has been welded to the base first portion 11a, connector element 330 is inserted into cavity 103 in direction B. Engagement between tabs 330a and sides of opening 12 in base first portion 11a force the tabs to deflect inwardly, toward body portion 330b. As the tabs pass the edges of base first portion and enter cavity 103, the tabs snap back into the position shown in FIG. 9. In this position, tabs 330a engage base first portion 11a if an attempt is made to withdraw the connector element from cavity 103. In this manner, the connector element is secured within cavity 103.

"Molding" of the initiator into the collar as described herein is understood to mean that a flowable molding material, adhesive material, or other material having a viscosity suitable for injecting, pouring, or otherwise inserting into the housing is introduced into the housing interior to occupy a space between the initiator and the collar, after the initiator has been positioned and secured for purposes of the molding operation. Thus, the collar 100a and initiator 20 form a portion of the mold. The molding material in contact with the collar, initiator, and the remainder of the mold in which the collar and initiator are positioned prior to molding then hardens or solidifies to encase a portion of the initiator and to secure the initiator to the collar.

Collar opening 104 is sized to be too small to permit a body portion 20a of initiator 20 to pass through the orifice from side 101b of the collar to an opposite side 101a of the collar in a first direction indicated by arrow "A" (FIG. 8A). This aids in preventing removal or ejection of initiator 20 through orifice 104.

FIGS. 1A, 1B, 2 and 5 show embodiments of the base 11 configured for receiving and securing a single initiator 20 thereto, as described below. FIGS. 11-14 show an embodiment of a base 111 configured for receiving and securing multiple initiators 20 thereto, in the same manner as previously described.

In the embodiments disclosed herein, molding materials for securing the initiator(s) to the base assembly may be selected based on such factors as desired fabrication methods, system operational requirements, and other pertinent factors. Materials such as polymers, pourable and injectable adhesives and potting compounds, and/or any other suitable materials may be used. Molding parameters such as pressure and temperature may be iteratively determined based on such factors as the molding materials and methods selected, the structure of the mold into which the molding material is to be inserted, and other pertinent factors.

Figure 8B:
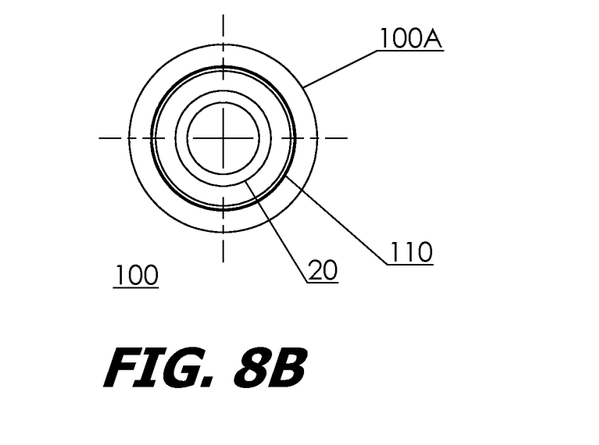
FIG. 8B is a plan view of the initiator assembly shown in FIG. 8A.

Referring to FIGS. 8A and 8B, initiator assembly 100 is attached to a respective base 11 or 111 using any suitable procedure. Referring to FIGS. 1A, 1B, 3A, 3B, 4 and 11-14, in one embodiment, the initiator assembly 100 is attached to the base by welding end portion 109 of collar 100a to base first portion 11a/111a such that the initiator assembly encloses or covers opening(s) 12 or 112a, 112b formed in the respective base first portion. Induction welding or any other suitable process may be used. Welding of the initiator assembly directly 100 to the base also forms a gas-tight seal between the respective base and the collar 100a. FIGS. 1B, 3A, 3B, 4, 5, 9 and 10 show cross sections of embodiments wherein an end portion 109 of a collar wall 102 welded to a base first portion 11a.

FIGS. 5 and 12 show respective embodiments 10 and 111 of the base assembly incorporated into respective gas generating systems 200 and 300. Referring to FIG. 5, gas generating system 200 includes a generally cylindrical housing 34 having base assembly 10 and a cap 36 affixed to the base assembly to form the system housing and defining a gas generant combustion chamber 99 surrounding the booster cup 54 (described below). Base assembly 10 incorporates therein an initiator assembly 100 as previously described, welded or otherwise suitably secured to base 11. Cap 36 has a plurality of openings 21 formed therealong to permit fluid communication between an interior of the housing and an associated airbag (not shown). Openings 21 may be covered with a foil (not shown) such as aluminum or stainless steel foil to prevent the incursion of water vapor into housing 34. The foil, sometimes referred to as "burst foil" is typically of a thickness of from 0.01 to about 0.20 mm. The foil is typically adhered to an interior surface of the housing through the use of an adhesive. Cap 36 also has a retainer 518 welded or otherwise suitably attached thereto, as previously described.

Booster cup 54 encloses the exposed portion of initiator 20 and defines a booster chamber 80 containing a known booster material 56 positioned within housing 34 so as to enable fluid communication between the booster material and gas generant material 60 upon activation of the inflator. Activation of initiator 20 produces combustion of the booster material, thereby effecting ignition of gas generant material 60 in a manner known in the art.

Gas generant material 60 is positioned exterior of booster cup 54 and within retainer cavity 18m. Gas generant 60 may be any known gas generant composition (including a smokeless gas generant composition) useful for airbag application and is exemplified by, but not limited to, compositions and processes described in U.S. Pat. Nos. 5,035,757, 5,872,329, 6,074,502, 6,287,400, 6,306,232 and 6,475,312 each incorporated by reference herein. Other suitable compositions are set forth in the U.S. patent application Ser. Nos. 10/407,300 and 60/369,775, incorporated by reference herein.

Referring again to FIG. 5, a known filter 70 occupies a plenum formed between the gas generant material 60 and an outer wall of housing 34. In the embodiment shown, filter 70 is positioned within the housing by abutment with retainer wall 18b.

FIG. 12 shows an dual-chamber embodiment 300 of the inflator. In addition to the elements shown in FIG. 5, inflator 300 includes an enclosure 54' forming a second combustion chamber 99' positioned within the main combustion chamber 99. Chamber 99' includes a second quantity of gas generant material 760 which may be ignited and combusted either in sequence with or simultaneously with gas generant 60 in the main combustion chamber 99, in a manner known in the art. A second initiator assembly 100' structured as previously described is provided for igniting gas generant 760.

Encosure 54' has gas exit openings (not shown) formed therealong to permit a flow of gas from chamber 99' into main chamber 99 after activation of the second chamber. These gas exit openings may be sealed prior to activation of the second chamber by rupturable seals or shims in a manner known in the art, or by any other method which will permit a flow of gases from chamber 99' into chamber 99 after activation of chamber 99', while also preventing undesired sympathetic ignition and combustion of the gas generant 760 due to combustion of gas generant 60 in main chamber 99.

Referring now to FIGS. 1C and 15, in an alternative embodiment similar to initiator assembly 100 shown in FIGS. 8A and 8B, an initiator assembly 700 includes a collar 700a and initiator 20 molded to the collar using a flowable molding material 110 as described below. Collar 700a includes a base portion 701 and an annular wall 702 extending from and along a periphery of the base portion to define a cavity 703 therebetween. An opening 704 is formed in collar base portion 701 and is structured for receiving a portion of initiator 20 therethrough prior to execution of the molding operation. The very end or edge 709 of collar wall 702 may include features (such as projections or raised surfaces) formed therealong to facilitate welding of the end of the collar wall to gas generating system bases 11 and 111, in the manner previously described with regard to initiator assembly 100.

In the embodiment shown in FIG. 15, the molding material 110 forms a single, continuous mass extending along a first side 701a of the collar base portion, through opening 704, and along a second side 701b of the collar base portion. As this mass contacts both sides of the collar base portion and also contacts the walls of the base portion along opening 704, the molding material 110 forms a plug which is firmly fixed in position with respect to collar 700a. The solidified molding material 110 also acts to form a gas-tight seal between the collar and the initiator. It is also seen from FIG. 15 that this embodiment of the initiator assembly does not include a portion of the molding material 110 extending along a portion of the collar wall to form an annular wall similar to wall 110a of initiator assembly 100 (FIG. 8A). FIG. 1C is a cross-sectional side view of a base assembly for a gas generating system housing incorporating the initiator assembly shown in FIG. 15. FIG. 15 also shows an embodiment of the positioning of the various welds attaching the retainer 18 to the base 11, the initiator assembly 100 to the base 11, and the retainer 18 to the initiator assembly 100. Although the weld positions and spatial interrelationships are illustrated using an embodiment of the base assembly incorporating a single initiator assembly, the weld positions and spatial interrelationships shown will also apply to an embodiment of the base assembly incorporating two initiator assemblies, as shown in FIG. 11.

Operation of the inflator embodiments shown in FIG. 5 and FIG. 12 will now be discussed.

Upon a crash event, a signal from a crash sensor (not shown) is conveyed to initiator 20, thereby activating booster propellant 56. Heat from combustion of booster propellant 56 produces ignition of gas generant 60. Inflation gas produced by combustion of gas generant 60 proceeds radially out through filter 70, exiting housing 34 through openings 21.

In operation of the embodiment of FIG. 12, second chamber 99' may be activated simultaneously with or in sequence with chamber 99 depending on the requirements of a particular application, and responsive to a signal from a crash sensor conveyed to initiator 20' of initiator assembly 100'. Combustion of gas generant 760 is thereby initiated. The generated gases then flow from chamber 99' into chamber 99, then out of the gas generating system through openings 21.

Referring to FIG. 1C, in general, in one embodiment the initiator assembly collar 100a is welded or otherwise attached to base first portion 11a such that at least a portion of a force exerted on one of the base portion and the collar at a location proximate the attachment is transmitted through the attachment to the other one of the base first portion and the collar, and such that the attachment will be sustained during operation of the gas generating system and during the resulting expansion of the associated base assembly. Also, in one embodiment, the retainer welded or otherwise attached to base first portion 11a such that at least a portion of a force exerted on one of the base first portion and the retainer at a location proximate the attachment is transmitted through the attachment to the other one of the base first portion and the retainer, and such that the attachment will be sustained during operation of the gas generating system and during the resulting expansion of the associated base assembly. Also, in one embodiment, the retainer is welded or otherwise attached to the initiator assembly collar 100a such that at least a portion of a force exerted on one of the collar and the retainer at a location proximate the attachment is transmitted through the attachment to the other one of the collar and the retainer, and such that the attachment will be sustained during operation of the gas generating system and during the resulting expansion of the associated base assembly.

Figure 16A:
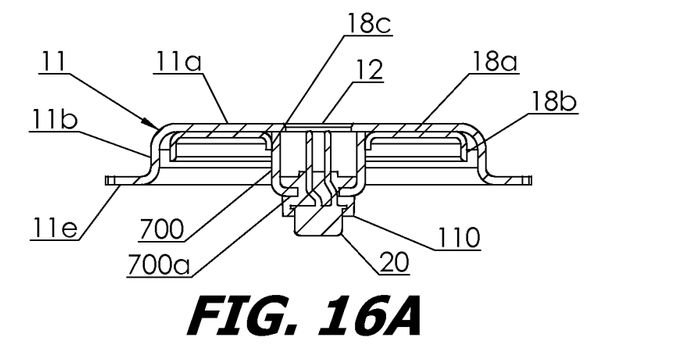
FIGS. 16A-16C show a progressive deflection of a base assembly in accordance with an embodiment of the present invention after activation of the gas generating system.
Figure 16B:
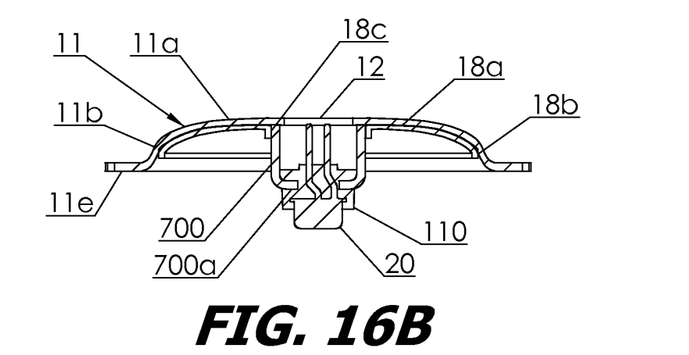
Figure 16C:
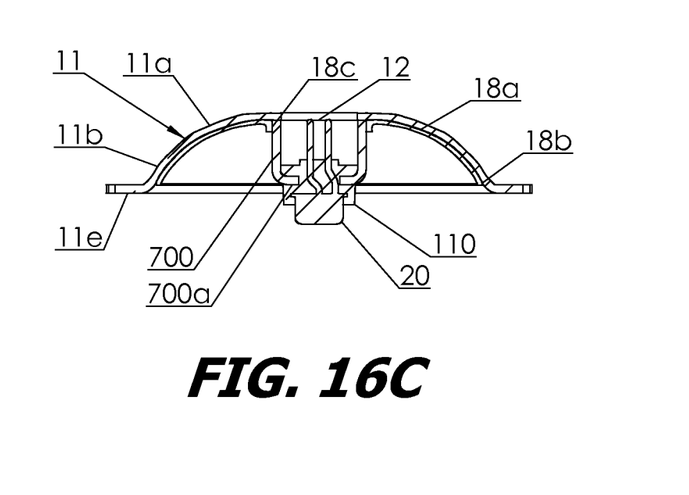

As seen from FIGS. 15 and 16A-16C, and as previously described, end 709 of collar wall 702 (or end 109 of collar wall 102, if the embodiment of the initiator assembly shown in FIGS. 8A and 8B is used) is welded or otherwise suitably attached to base first portion 11a such that wall 702 surrounds the opening 12 formed in the base, and such that a gas-tight seal is formed between the wall 702 and the base 11. It is desired that the inner diameter of the collar be positioned so as to concentric with the opening formed in the based. Also, retainer first portion 18a is welded or otherwise suitably attached to base first portion 11a. In addition, retainer wall 18c is welded or otherwise suitably attached to initiator assembly 700 along collar wall 702. In a particular embodiment, the collar wall 702 is welded or otherwise suitably attached to the retainer wall 18c along an end of the retainer wall, as shown in FIGS. 16A-16C. In all of the embodiments described here which utilize an embodiment of the filter retainer, the attachments between the base, retainer, and initiator assembly are structured so that these attachments are maintained as shown during resulting expansion of the associated base assembly during system operation, as shown in FIGS. 16A-16C.

FIGS. 16A-16C show a progression of expansion of a base assembly portion 710 constructed in accordance with FIG. 1C and incorporated into a housing of a gas generating system, after activation of the system. Although the expansion is described with respect to a base assembly incorporating a single initiator assembly as previously described, a similar expansion will occur in an embodiment of the housing incorporating a base assembly such as those shown in FIG. 11 or 13.

FIG. 16A shows the configuration of the base assembly 710 prior to and just after activation of the gas generating system. As the gas generant in the housing combusts, pressure due to generated gases produces deformation or expansion of the base assembly portion 710, to the configuration shown in FIG. 16B, then to the configuration shown in FIG. 16C. When the base, retainer and initiator assembly welded or otherwise suitably secured to each other as shown in FIG. 1C prior to operation of the gas generating system, the gas-tight seal between the initiator assembly collar and base 11 will be maintained during operation of the gas generating system and the resulting expansion of the associated base assembly. It is contemplated that the embodiments of the base assembly shown in FIGS. 11-14 would expand in a similar manner, and that the gas-tight seal formed between the initiator assembly collar and base 111 would be maintained during housing expansion.

To achieve the overall housing deformation shown in FIGS. 16A-16C, in one embodiment, the housing base, filter retainer, and initiator assembly are welded together as shown in FIG. 1C. FIG. 1C shows an embodiment of the base assembly accommodating a single initiator assembly. However, an embodiment of the base assembly including a pair of initiator assemblies may be assembled in the same manner, using the same weld arrangement.

In the embodiment shown in FIG. 1C, a continuous weld 990 is applied to secure the filter retainer first portion 18a to base first portion 11a proximate inner wall 18c. In one embodiment, weld 990 is a continuous laser weld which acts to form a gas-tight seal between the retainer and the base. Initiator assembly 700 is attached using a weld 992 to base first portion 11a so as to enclose opening 12 formed in base 11. In one embodiment, weld 992 is a continuous projection weld, which acts to form a gas-tight seal between the initiator assembly collar and the base. Also, wall 18c is attached using a weld 994 to an adjacent outer surface 700s of wall 702 of initiator assembly 700. In one embodiment, weld 994 is a continuous laser weld which acts to form a gas-tight seal between the initiator assembly collar and the retainer. In a particular embodiment, the weld is formed along an end of wall 18c. However, the housing base, filter retainer, and initiator assembly may welded or otherwise connected together using any types of welds or other attachments suitable for the purposes described herein.

Figure 6:
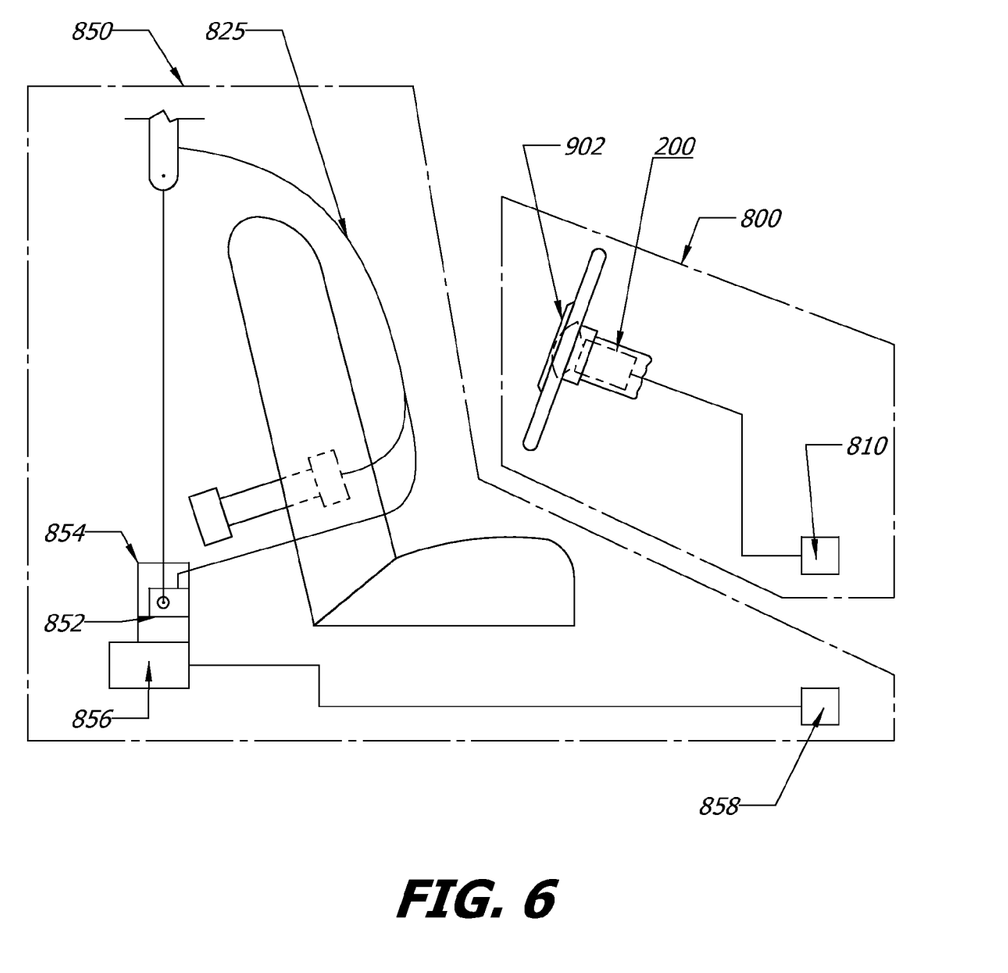
FIG. 6 is a schematic representation of an exemplary vehicle occupant protection system incorporating a gas generating system having a base assembly in accordance with an embodiment of the present invention.

Referring now to FIG. 6, in one possible application of an embodiment of the base assembly described herein, gas generating system 200 or another gas generating system including another embodiment of the base assembly is incorporated into an airbag system 800. Airbag system 800 includes at least one airbag 902 and a gas generating system including an embodiment of the base assembly coupled to the airbag so as to enable fluid communication with an interior of the airbag upon activation of the gas generating system. System 800 may be in communication with a crash event sensor 810 that includes (or is in operative communication with) a crash sensor algorithm (not shown) which signals activation of airbag system 800 via, for example, activation of initator 20 (not shown in FIG. 6) in the event of a collision.

Referring again to FIG. 6, a gas generating system including an embodiment of the base assembly, or an airbag system including such a gas generating system may be also incorporated into a broader, more comprehensive vehicle occupant protection system 880 including additional elements such as a safety belt assembly 850. Safety belt assembly 850 includes a safety belt housing 852 and a safety belt 825 extending from housing 852. A safety belt retractor mechanism 854 (for example, a spring-loaded mechanism) may be coupled to an end portion of the belt. In addition, a safety belt pretensioner 856 may be coupled to belt retractor mechanism 854 to actuate the retractor mechanism in the event of a collision. Typical seat belt retractor mechanisms which may be used in conjunction with safety belt 825 are described in U.S. Pat. Nos. 5,743,480, 5,553,803, 5,667,161, 5,451,008, 4,558,832 and 4,597,546, incorporated herein by reference. Illustrative examples of typical pretensioners with which safety belt 825 may be combined are described in U.S. Pat. Nos. 6,505,790 and 6,419,177, incorporated herein by reference.

Safety belt assembly 850 may be in communication with a crash event sensor 858 (for example, an inertia sensor or an accelerometer) that includes (or is in operative communication with) a crash sensor algorithm (not shown) which signals actuation of belt pretensioner 856 via, for example, activation of initiator 24 (not shown in FIG. 6) or another initiator (not shown) incorporated into the pretensioner. U.S. Pat. Nos. 6,505,790 and 6,419,177, previously incorporated herein by reference, provide illustrative examples of pretensioners actuated in such a manner.

It will be appreciated that the various constituents described above are formed in known manners. For example, the various components may be molded. stamped or otherwise formed from carbon steel, aluminum, metallic alloys, or any of a variety of polymers.

It will be understood that the foregoing descriptions of embodiments of the present invention are for illustrative purposes only. As such, the various structural and operational features disclosed herein are susceptible to a number of modifications commensurate with the abilities of one of ordinary skill in the art, none of which departs from the scope of the present invention as defined in the appended claims.

What is claimed is:

1. A base assembly for a gas generating system, the assembly comprising:
 a base having at least one opening formed therein, the base having an interior cavity;
 an initiator assembly attached to the base so as to form a gas-tight seal surrounding the at least one opening; and
 a retainer including a base portion directly attached to the base, the base portion including an opening into which a portion of the initiator assembly extends, the retainer including an inner wall extending from a first edge of the base portion into the base interior cavity, the retainer also including an outer wall extending from a second edge of base portion opposite the first edge into the base interior cavity wherein the retainer inner wall defines a portion of the retainer opening, and wherein the initiator assembly extends along at least a portion of the inner wall, and wherein the initiator assembly is attached to the retainer wall by welding.

2. The base assembly of claim 1 wherein an interference fit is formed between the retainer and the portion of the initiator assembly.

3. The base assembly of claim 1 wherein the initiator assembly is attached to the retainer inner wall along an end of the wall.

4. The base assembly of claim 1 wherein the base has a flat first portion and the retainer has a flat base portion, and wherein the retainer base portion is welded to the base first portion.

5. A base assembly for a gas generating system, the assembly comprising:

a base having at least one opening formed therein;

an initiator assembly attached to the base so as to form a gas-tight seal surrounding the at least one opening; and a retainer attached to the base and including an opening into which a portion of the initiator assembly extends, wherein the retainer is attached to the initiator assembly along the retainer opening, wherein an interference fit is formed between the retainer and the portion of the initiator assembly, and wherein the initiator assembly includes a collar structured to surround the at least one base opening, and wherein the collar is welded to the base so as to surround the at least one base opening and so as to form the gas-tight seal.

6. A base assembly for a gas generating system, the assembly comprising:

a base having at least one opening formed therein;

an initiator assembly attached to the base so as to form a gas-tight seal surrounding the at least one opening; and a retainer attached to the base and including an opening into which a portion of the initiator assembly extends, wherein the retainer is attached to the initiator assembly along the retainer opening, and wherein the initiator assembly is welded to the base to form the gas-tight seal.

7. A base assembly for a gas generating system, the assembly comprising:

a base;

an initiator assembly welded to the base so as to form a gas-tight seal between the initiator assembly and the base; and a retainer welded to the base and to the initiator assembly.

8. A gas generating system including a base assembly in accordance with claim 7.

9. A vehicle occupant protection system including a gas generating system in accordance with claim 8.

10. A gas generating system including a base assembly in accordance with claim 6.

11. A vehicle occupant protection system including a gas generating system in accordance with claim 10.

12. A gas generating system including a base assembly in accordance with claim 5.

13. A vehicle occupant protection system including a gas generating system in accordance with claim 12.

14. A gas generating system including a base assembly in accordance with claim 1.

15. A vehicle occupant protection system including a gas generating system in accordance with claim 14.

* * * * *

UNITED STATES PATENT AND TRADEMARK OFFICE
CERTIFICATE OF CORRECTION

Page 1 of 2

PATENT NO. : 8,936,272 B1
APPLICATION NO. : 13/859701
DATED : January 20, 2015
INVENTOR(S) : Quioc et al.

It is certified that error appears in the above-identified patent and that said Letters Patent is hereby corrected as shown below:

In the Drawings

Fig. 6; Please insert --880-- in the center above the drawing as shown. (See attached)

In the Specification

Column 9; Line 63: Please insert --be-- after may.

Signed and Sealed this
Twenty-third Day of August, 2016

Michelle K. Lee
*Director of the United States Patent and Trademark Office*

FIG. 6